United States Patent
Sadakane et al.

(10) Patent No.: US 10,946,622 B2
(45) Date of Patent: Mar. 16, 2021

(54) GLASS

(71) Applicant: AGC Inc., Chiyoda-ku (JP)

(72) Inventors: Shunsuke Sadakane, Chiyoda-ku (JP); Kazuyoshi Noda, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 388 days.

(21) Appl. No.: 15/343,832

(22) Filed: Nov. 4, 2016

(65) Prior Publication Data

US 2017/0072663 A1 Mar. 16, 2017

Related U.S. Application Data

(63) Continuation of application No. PCT/JP2015/071199, filed on Jul. 27, 2015.

(30) Foreign Application Priority Data

Jul. 30, 2014 (JP) .............................. JP2014-155188
Apr. 21, 2015 (JP) .............................. JP2015-087068

(51) Int. Cl.
*B32B 17/10* (2006.01)
*G02B 27/01* (2006.01)

(52) U.S. Cl.
CPC .. *B32B 17/10568* (2013.01); *B32B 17/10036* (2013.01); *G02B 27/0101* (2013.01); *B32B 2605/006* (2013.01); *G02B 2027/0121* (2013.01)

(58) Field of Classification Search
None
See application file for complete search history.

(56) References Cited

U.S. PATENT DOCUMENTS

| | | | |
|---|---|---|---|
| 5,013,134 A * | 5/1991 | Smith | B32B 17/10568 345/7 |
| 5,812,332 A | 9/1998 | Freeman | |
| 6,414,796 B1 * | 7/2002 | Muromachi | B32B 17/10036 340/980 |
| 2010/0314900 A1 | 12/2010 | Labrot et al. | |
| 2013/0149503 A1 * | 6/2013 | Yamamoto | B32B 17/10568 428/172 |

(Continued)

FOREIGN PATENT DOCUMENTS

JP 5315358 10/2013
WO WO 2009/071135 A1 6/2009

OTHER PUBLICATIONS

Extended European Search Report dated Mar. 5, 2018 in Patent Application No. 15827689.9, 11 pages.

(Continued)

*Primary Examiner* — David Sample
(74) *Attorney, Agent, or Firm* — Oblon, McClelland, Maier & Neustadt, L.L.P.

(57) ABSTRACT

Glass having an inner surface and an outer surface, includes a first area used by a head-up display, and a second area adjacent to the first area, and not used by the head-up display. Representing an area closest to a boundary between the first area and the second area in the first area, by an edge on the boundary side in the first area, and representing an area closest to the boundary in the second area, by an edge on the boundary side in the second area, a requirement is that a wedge angle δ formed by the inner surface and the outer surface satisfies a predetermined formula.

20 Claims, 9 Drawing Sheets

(56) References Cited

U.S. PATENT DOCUMENTS

| | | | |
|---|---|---|---|
| 2016/0159041 A1* | 6/2016 | Lu | B32B 17/10568 |
| | | | 428/162 |
| 2016/0168353 A1* | 6/2016 | Spangler | C08K 5/103 |
| | | | 428/172 |
| 2016/0291324 A1* | 10/2016 | Arndt | B32B 17/10036 |

OTHER PUBLICATIONS

Von Jean Pierre Acloque, et al., "Doppelbilder als störender optischer Fehier der Windschutzscheibe". Glastechnische Berichte, XP009502701, 1970, pp. 193-198.

International Search Report dated Oct. 6, 2015 in PCT/JP2015/071199, filed on Jul. 27, 2015 (with English Translation).

Written Opinion dated Oct. 6, 2015 in PCT/JP2015/071199, filed on Jul. 27, 2015.

\* cited by examiner

GLASS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2015/071199 filed on Jul. 27, 2015 and designating the U.S., which claims priority of Japanese Patent Application No. 2014-155188 filed on Jul. 30, 2014, and Japanese Patent Application No. 2015-087068 filed on Apr. 21, 2015. The entire contents of the foregoing applications are incorporated herein by reference.

BACKGROUND OF THE INVENTION

1. Field of the Invention

The present disclosure relates to glass.

2. Description of the Related Art

In recent years, introduction of head-up displays (referred to as "HUD", below) has made progress, with which predetermined information is displayed in the field of vision of the driver of a vehicle, by reflecting images on the windshield of the vehicle. However, there may be cases where double images pose a problem when the driver is visually recognizing an outside scene or information displayed by the HUD.

There are two types of double images that pose problems for the driver of a vehicle. The first type is perspective double images that are caused by, for example, an intense light source such as a headlight of an oncoming vehicle during the night time. This is double vision of the light source, caused by a first beam and a second beam together forming a certain angle, where the second beam is a ray of light incident on the windshield, and reflected in the windshield before entering an eye of the driver.

The second type is reflective double images, caused by an HUD. This is double vision of images by the HUD, caused by a first beam and a second beam together forming a certain angle, where the second beam is a ray of light from the light source of the HUD reflected on the outer surface of the windshield before entering an eye of the driver.

Therefore, if the windshield has an HUD-display area used by the HUD, and a non-HUD-display area (a transparent area) not used by the HUD, the main problem posed in the HUD-display area is reflective double images although perspective double images may also pose a problem, and the problem posed in the non-HUD-display area is perspective double images.

It has been known that such reflective double images or perspective double images can be reduced by using a wedge-shaped film for the windshield. For example, a windshield has been proposed, by which reflective double images or perspective double images can be reduced by using an intermediate film whose wedge angle is changed from the lower side to the upper side of the windshield (see, for example, Patent Document 1 (Japanese Patent No. 5315358)).

Incidentally, since reflective double images and perspective double images are generated by different principles, both may not be eliminated at the same time by using a wedge angle having a certain value. By using a wedge film that eliminates perspective double images, reflective double images may not be eliminated at the same time as it is, and vice versa. Therefore, for a glass having an HUD-display area and a non-HUD-display area, it is necessary to change the wedge angle at the boundary between the HUD-display area and the non-HUD-display area.

However, if the wedge angle is steeply changed in a certain area in the glass, a problem arises in that perspective distortion is generated in the steeply changed area (transitioning area).

In view of the above, a problem to be solved by at least one embodiment in the present disclosure is to provide glass with which perspective distortion generated at the boundary between the HUD-display area and the non-HUD-display area can be reduced.

SUMMARY OF THE INVENTION

According to an embodiment in the present disclosure, Glass having an inner surface and an outer surface, includes a first area used by a head-up display; and a second area adjacent to the first area, and not used by the head-up display. Representing an area closest to a boundary between the first area and the second area in the first area, by an edge on the boundary side in the first area, and representing an area closest to the boundary in the second area, by an edge on the boundary side in the second area, a wedge angle $\delta$ formed by the inner surface and the outer surface satisfies a following Formula (1) at each point in a partial area of the second area including the edge on the boundary side in the second area:

$$\delta = \frac{t}{R} \frac{\sin\varphi\cos\varphi}{n^2 - \sin^2\varphi} - \eta \frac{\cos\varphi}{2\sqrt{n^2 - \sin^2\varphi}} \quad (1)$$

where, except for a case of the wedge angle $\delta$ being uniform, t represents a thickness of the glass, R represents a local curvature radius of the glass, n represents a refractive index of the glass, and $\varphi$ represents a local incident angle of a ray of light incident on the glass. Representing the wedge angle at the edge on the boundary side in the first area by $\delta_h$, and representing an angle of perspective double images at the edge on the boundary side in the first area by $\eta_h$, $\eta_h$ is represented by a following Formula (2) where $\eta$ is an arbitrary value having a same sign as a sign of $\eta_h$, and satisfies conditions of being less than or equal to a smaller one of $2|\eta_h|$ and 9 if $|\eta_h| \leq 9$, being less than or equal to $|\eta_h|$ if $|\eta_h| > 9$ (further, $\eta$ is not 0 at all points in the part of the area, and $0<|\eta|$ is satisfied at the edge on the boundary side in the second area):

$$\eta_h = \frac{2t}{R} \frac{\sin\varphi}{\sqrt{n^2 - \sin^2\varphi}} - \frac{2\delta_h \sqrt{n^2 - \sin^2\varphi}}{\cos\varphi} \quad (2)$$

According to an embodiment in the present disclosure, it is possible to provide glass with which perspective distortion generated at the boundary between the HUD-display area and the non-HUD-display area can be reduced.

Other objects, features and advantages of the present invention will become more apparent from the following detailed description when read in conjunction with the accompanying drawings.

DESCRIPTION OF THE PREFERRED EMBODIMENTS

In the following, embodiments will be described with reference to the drawings. Throughout the drawings, the same elements are assigned the same reference symbols, and duplicated description may be omitted. Note that although a windshield for a vehicle will be taken as an example for the description here, the application is not limited as such, but the glass according to the embodiments can be applicable to glass other than windshields for vehicles.

Figure 1A:
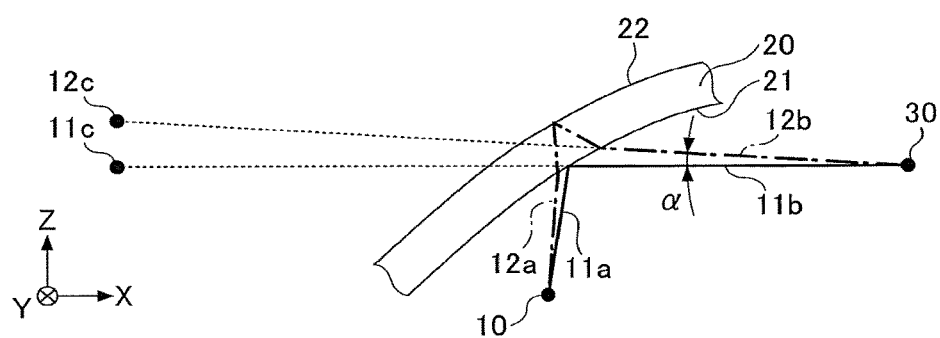
FIG. 1A-B are diagrams illustrating concepts of double images.
Figure 1B:
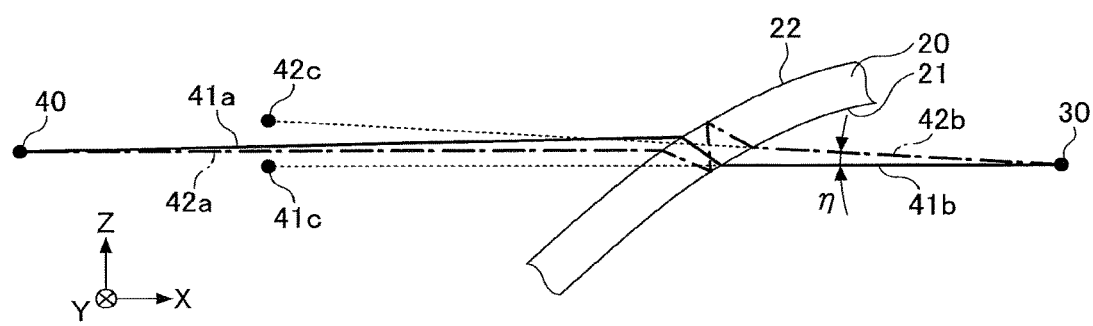

First, concepts of reflective double images and perspective double images will be described. FIG. 1 includes diagrams illustrating concepts of double images; FIG. 1A illustrates reflective double images, and FIG. 1B illustrates perspective double images. Note that in FIG. 1, X designates the back-and-forth direction of the vehicle having the windshield 20 installed, Y designates the left-and-right direction of the vehicle, and Z designates the direction perpendicular to the XY plane (the same in the following drawings).

As illustrated in FIG. 1A, a part of rays of light 11a emitted from a light source 10 of an HUD is reflected on the inner surface 21 of the windshield 20 of the vehicle, and is brought to an eye 30 of the driver as a ray of light 11b (a first beam), to be visually recognized by the driver as an image 11c (a virtual image) formed in front of the windshield 20.

Also, a part of rays of light 12a emitted from the light source 10 of the HUD is incident on the windshield 20 of the vehicle through the inner surface 21 and refracted, and a part of which is reflected on the outer surface 22. Then, further, a part of the reflected part goes out of the windshield 20 of the vehicle through the inner surface 21 with refraction, and is brought to the eye 30 of the driver as a ray of light 12b (a second beam), to be visually recognized by the driver as an image 12c (a virtual image). Note that the thickness of the windshield 20 is uniform, and the inner surface 21 and the outer surface 22 are parallel with each other.

These two images 11c and 12c visually recognized by the driver in this way are reflective double images. Also, an angle formed by the ray of light 11b (the first beam) and the ray of light 12b (the second beam) is the angle α of the reflective double images. The angle α of the reflective double images closer to zero is more preferable.

Also, as illustrated in FIG. 1B, a part of rays of light 41a emitted from a light source 40 is incident on the windshield 20 of the vehicle through the outer surface 22 and refracted, and a part of which goes out of the windshield 20 of the vehicle through the inner surface 21, and is brought to the eye 30 of the driver as a ray of light 41b, to be visually recognized by the driver as an image 41c.

Also, a part of rays of light 42a emitted from the light source 40 is incident on the windshield 20 of the vehicle through the outer surface 22 and refracted, and a part of which is reflected on the inner surface 21. Then, a part of the reflected part is further reflected on the outer surface 22, and further, a part of the twice reflected part goes out of the windshield 20 through the inner surface 21 with refraction, and is brought to the eye 30 of the driver as a ray of light 42b, to be visually recognized by the driver as an image 42c.

These two images 41c and 42c visually recognized by the driver in this way are perspective double images. Also, an angle formed by the ray of light 41b (the first beam) and the ray of light 42b (the second beam) is the angle η of perspective double images. The angle η of perspective double images closer to zero is more preferable.

FIG. 2 includes diagrams that exemplify a windshield for a vehicle; FIG. 2A is a diagram schematically illustrating a windshield viewed from the front side of a vehicle, and FIG. 2B is a partial cross-sectional view parallel to the XZ plane in FIG. 2A. Note that in FIG. 2A, an HUD-display area A is illustrated by a pattern having small dots for convenience's sake.

Figure 2A:
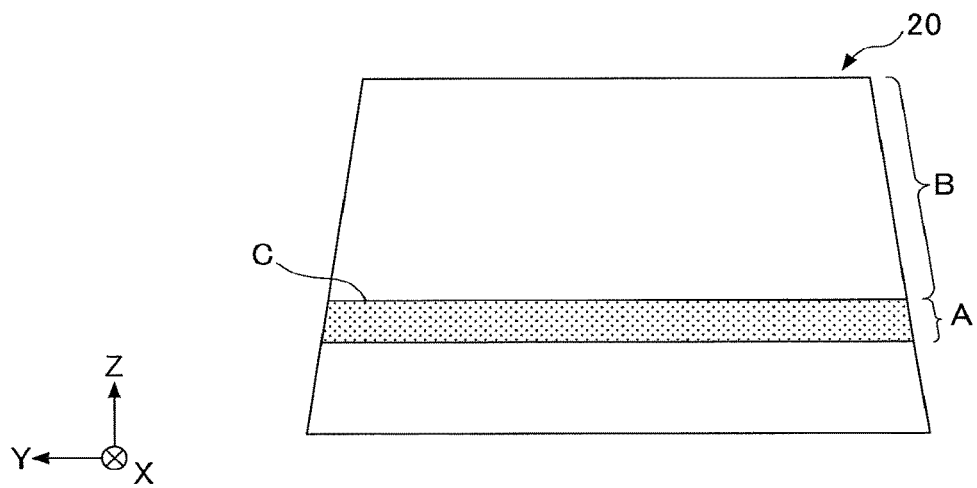
FIG. 2A-2B are diagrams illustrating a windshield for a vehicle.

As illustrated in FIG. 2A, the windshield 20 includes the HUD-display area A used by the HUD, and a non-HUD-display area B (a transparent area) not used by the HUD. The HUD-display area A is positioned downwards on the windshield 20, and the non-HUD-display area B is adjacent to the HUD-display area A, and positioned upwards with respect to the HUD-display area A on the windshield 20. A line C represents the boundary between the HUD-display area A and the non-HUD-display area B.

Figure 2B:
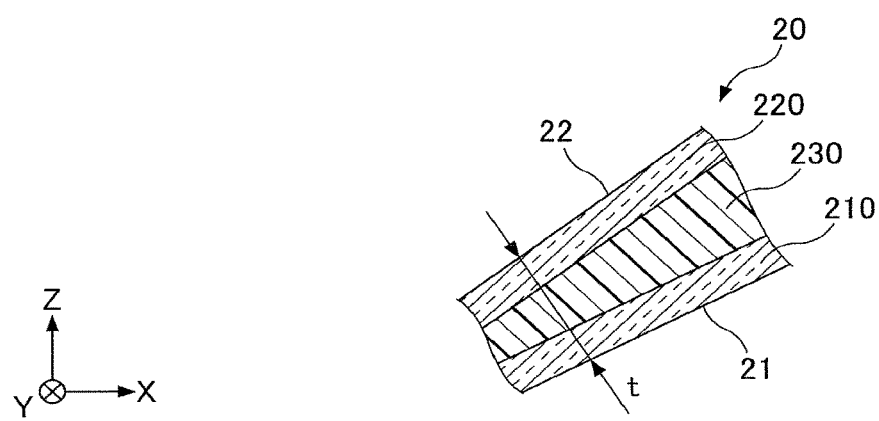
Figure 2C:
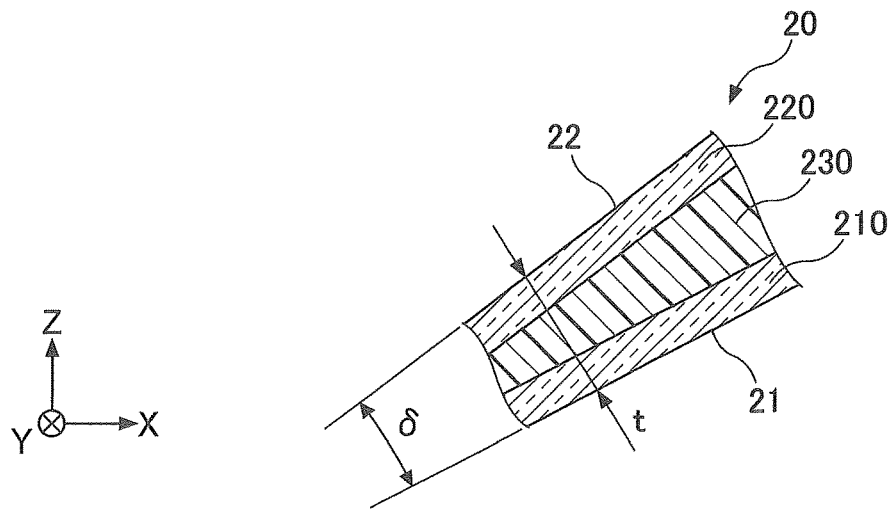
FIG. 2C is a diagram illustrating a wedge angle δ.
Figure 2D:
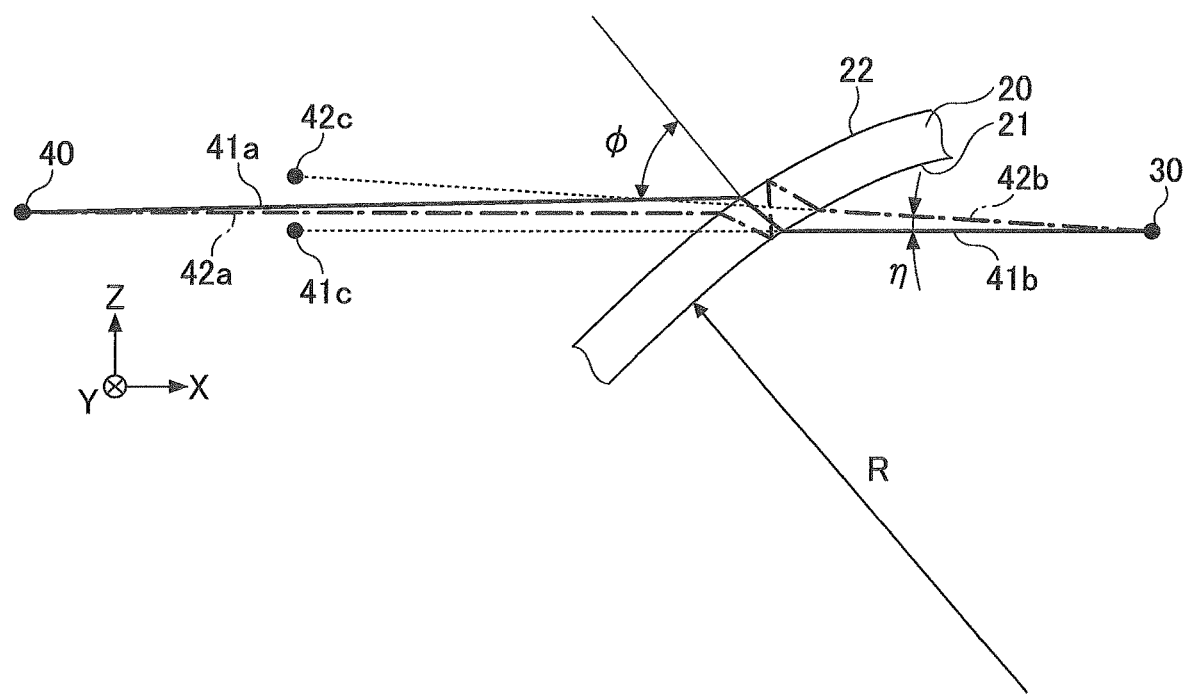
FIG. 2D is a diagram illustrating a local incident angle φ, and a local curvature radius of the glass R.
Figure 2E:
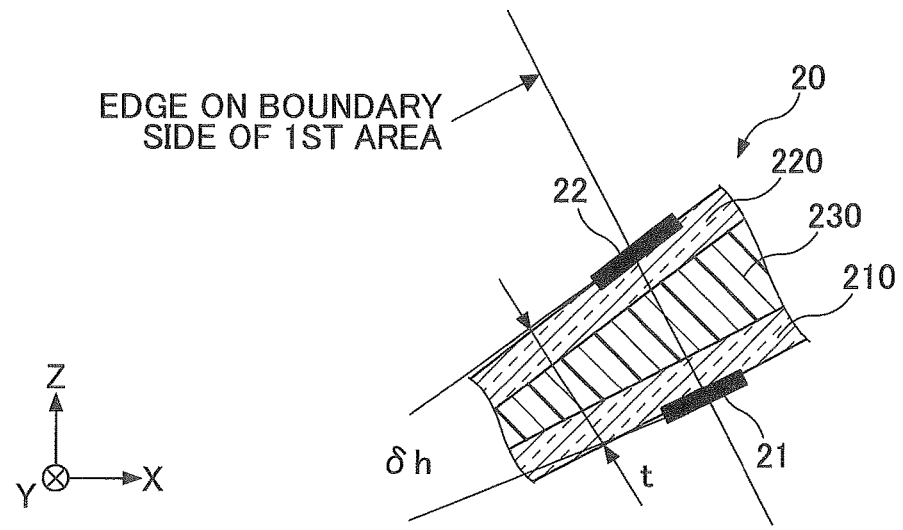
FIG. 2E is a diagram illustrating a wedge angle at the edge on the boundary side of a first area $δ^h$.
Figure 2F:
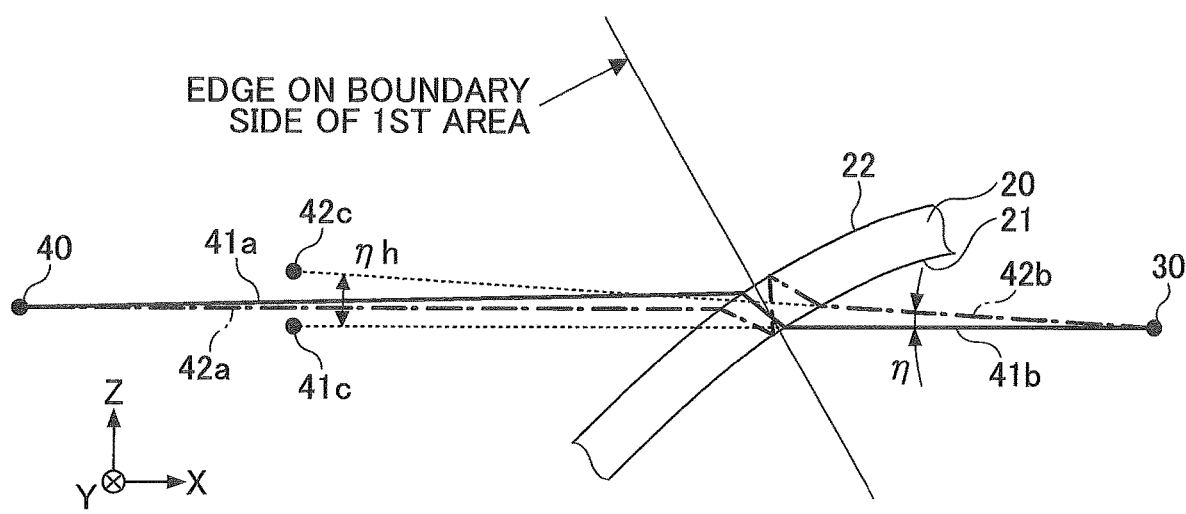
FIG. 2F is a diagram illustrating an angle of perspective double images $η_h$.

As illustrated in FIG. 2B, the windshield 20 may have a structure in which a glass plate 210 and a glass plate 220 are bonded together in a state where an intermediate film 230 is interposed between the plates. The thickness of the glass plate 210 is uniform, and the thickness of the glass plate 220 is also uniform. However, the thickness of the glass plate 210 and the thickness of the glass plate 220 may not be the same.

Also, the inner surface 21 of the windshield 20 as one surface of the glass plate 210 and the outer surface 22 of the windshield 20 as one surface of the glass plate 220 may be flat surfaces, or may be curved surfaces. The windshield 20 may have a shape, for example, curving in the vertical direction. Note that "t" represents a local thickness of the windshield 20 (a total thickness of the glass plate 210, the glass plate 220, and the intermediate film 230 at a local position). Here, FIG. 2B illustrates just an example of the present application; it may be needless to say, but the windshield 20 may be constituted with glass having a wedge-shaped cross section, combined with an intermediate film.

The intermediate film 230 is formed to have a wedge shape in cross-sectional view. An angle formed by a surface of the intermediate film 230 contacting the glass plate 210, and another surface of the intermediate film 230 contacting the glass plate 220, will be referred to as the wedge angle δ. The wedge angle δ may take appropriates values corresponding to positions in the Z direction. An area may exist in which the surface of the intermediate film 230 contacting the glass plate 210 and the surface of the intermediate film 230 contacting the glass plate 220 are parallel to each other.

A method of determining a preferable value of the wedge angle δ will be described later. Note that since the thicknesses of the glass plates 210 and 220 are uniform, the wedge angle δ may be regarded as the angle formed by the inner surface 21 and the outer surface 22 of the windshield 20.

Publicly known transparent glass may be used for the glass plates 210 and 220, but general-purpose colored glass for vehicles may be used. As the material of the glass plates 210 and 220, for example, inorganic glass, organic transparent resin glass (such as polycarbonate), a mixture of these, or the like may be used. In the case of inorganic glass, functional glass such as heat-absorbing glass (in green color or the like) may be used, and the glass may have a strengthened stress layer (physically strengthened or chemically strengthened) as the surface layer.

The intermediate film 230 may be produced, for example, by extrusion molding or the like by using publicly known transparent resin. As an example of such transparent resin, polyvinyl butyral, polyvinyl alcohol, polyethylene terephthalate, or the like may be considered. If necessary, the intermediate film 230 may be formed by stacking multiple layers, and may include functional fine particles (for example, of a heat-shield material such as ITO, ATO, and a phthalocyanine compound) in the layers.

As described above, if the wedge angle δ is steeply changed at the boundary C between the HUD-display area A and the non-HUD-display area B, a problem arises in that perspective distortion is generated around the boundary C. Also, when bonding the glass plate 210 and the glass plate 220 by using the intermediate film 230, a bubbling phenomenon may be generated around the area where the wedge angle δ is steeply changed (the boundary between the intermediate film 230 and the glass plate 210, or between the intermediate film 230 and the glass plate 220).

Thereupon, in the embodiment, a method of determining the wedge angle δ is derived, with which the risk of generating perspective distortion and bubbling around the boundary C can be reduced more compared to conventional methods. Specifically, the risk of generating perspective distortion and bubbling around the boundary C can be reduced more compared to conventional methods, by applying the wedge angle δ that satisfies the following Formula (1), to each point in a partial area of the non-HUD-display area B including an edge on the boundary C side in the non-HUD-display area B.

Figure 3A:
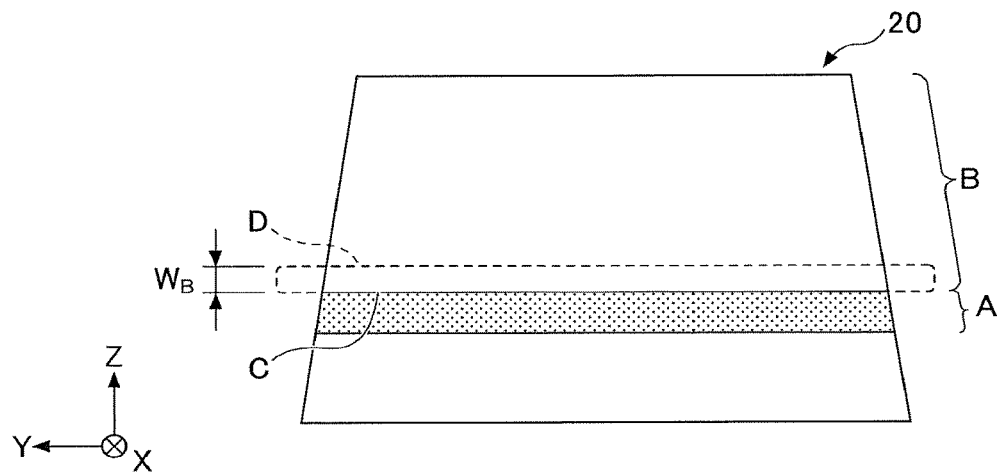
FIG. 3A-3B are diagrams illustrating an edge on a boundary side.

Note that the "edge on the boundary C side in the non-HUD-display area B" is an area closest to the boundary C in the non-HUD-display area B. In FIG. 3A, an area D represents a partial area of the non-HUD-display area B adjacent to the boundary C, and has the width $W_B$. Although the non-HUD-display area B is exemplified as an upward area in FIG. 3A, it should be noted that the non-HUD-display area B includes a downward area below the HUD-display area A. In FIG. 3A, the area D adjacent to the boundary C, having the width $W_B$ close to zero to the utmost, is the edge on the boundary C side in the non-HUD-display area B.

Figure 3B:
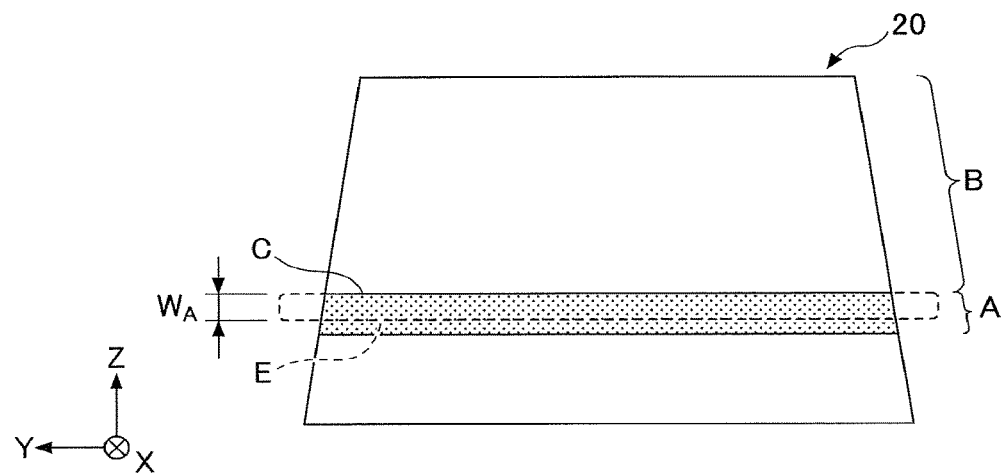

Similarly, the edge on the boundary C side in the HUD-display area A is an area closest to the boundary C in the HUD-display area A. In FIG. 3B, an area E represents a part of HUD-display area A adjacent to the boundary C, and has the width $W_A$. In FIG. 3B, the area E adjacent to the boundary C, and having the width $W_A$ close to zero to the utmost, is the edge on the boundary C side in the HUD-display area A.

At least in a part the non-HUD-display area B including the edge on the boundary C side in the non-HUD-display area B, the wedge angle δ is determined by using Formula (1), for example, at each point on a perpendicular line that includes the HUD-display area A of the windshield 20. However, the wedge angle δ may be determined by using Formula (1) with reference to FIG. 2C-2F, for example, so that it changes continuously in the horizontal direction of the windshield 20.

$$\delta = \frac{t}{R} \frac{\sin\varphi\cos\varphi}{n^2 - \sin^2\varphi} - \eta \frac{\cos\varphi}{2\sqrt{n^2 - \sin^2\varphi}} \qquad (1)$$

where except for a case of the wedge angle δ being uniform, t represents the thickness of the windshield 20, R represents the local curvature radius of the windshield 20, n represents the refractive index of the windshield 20, and φ represents the local incident angle of a ray of light incident on the windshield 20.

Also, by representing the wedge angle at the edge on the boundary C side in the HUD-display area A by the wedge angle $\delta_h$, and by representing the angle of perspective double images at the edge on the boundary C side in the HUD-display area A by $\eta_h$, $\eta_h$ is represented by the following Formula (2), and η is an arbitrary value having the same sign as $\eta_h$ that satisfies conditions of being less than or equal to the smaller one of $2|\eta_h|$ and 9 if $|\eta_h|\le 9$, being less than or equal to $|\eta_h|$ if $|\eta_h|>9$ (further, η is not equal to 0 at all points in a partial area of the non-HUD-display area B including the edge on the boundary C side in the non-HUD-display area B, and $0<|\eta|$ at the edge on the boundary C side in the non-HUD-display area B).

$$\eta_h = \frac{2t}{R} \frac{\sin\varphi}{\sqrt{n^2 - \sin^2\varphi}} - \frac{2\delta_h\sqrt{n^2 - \sin^2\varphi}}{\cos\varphi} \qquad (2)$$

Here, the "sign" means a symbol to represent whether a number is positive or negative; "+" is a symbol to represent a positive number, and "−" is a symbol to represent a negative number. Note that indication of "+" may be omitted. Here, the angle of perspective double images and the angle of reflective double images are in the "+" direction if the second beam (dark light) is above the first beam (bright light) (for example, cases of FIG. 1A and FIG. 1B), or in the "−" direction in opposite cases.

Note that as described in Patent Document 1, the angle of perspective double images can be calculated following Formula (3), depending on the curvature radius and the incident angle of the ray of light. Also, the wedge angle δ necessary to remove double images having the curvature radius $R_c$ and the incident angle φ can be calculated following Formula (4). Formulas (1) and (2) have been derived by the inventors based on Formulas (3) and (4) with further investigation.

$$\eta = \frac{2t}{R_c} \frac{\sin\varphi}{\sqrt{n^2 - \sin^2\varphi}} \qquad (3)$$

$$\delta = \frac{t}{R_c} \frac{\sin\varphi\cos\varphi}{n^2 - \sin^2\varphi} \qquad (4)$$

Next, effects obtained with the wedge angle δ determined by Formula (1) will be described in application examples, contrasting with comparative examples.

Application Example 1

In the application example 1, an example will be described in which Formula (1) is applied to each point in the entire area of the non-HUD-display area B including the edge on the boundary C side in the non-HUD-display area B.

Description of Application Example 1 and Comparative Examples 1 to 4

First, comparative examples 1 to 4 will be described. The comparative example 1 is a case in which both the wedge angle δ in the HUD-display area A and the wedge angle δ in the non-HUD-display area B are zero mrad (the inner surface 21 and the outer surface 22 of the windshield 20 are always parallel to each other in the HUD-display area A and the non-HUD-display area B). The comparative example 2 is a case in which both the wedge angle δ in the HUD-display area A and the wedge angle δ in the non-HUD-display area B are 0.7 mrad. The comparative example 3 is a case in which the wedge angle δ in the HUD-display area A is 0.7 mrad, and the wedge angle δ in the non-HUD-display area B is zero mrad.

The comparative example 4 is a case that is described in Patent Document 1. In other words, that is the case in which the wedge angle δ in the HUD-display area A is determined based on the following Formulas (5), (6), (7), and the like, and the wedge angle δ in the non-HUD-display area B is determined based on the above Formula (4).

$$\tan\eta_1 = \frac{R_i \sin(\theta - \theta_i)}{R_c \cos\theta_i} \quad (5)$$

$$\tan\eta_2 = \frac{t\tan\varphi_i - R_c\tan\eta_1}{R_c + t} \quad (6)$$

$$\tan\eta_3 = \frac{t(\tan\varphi_i + \tan\varphi_r) - R_c\tan\eta_1}{R_c} \quad (7)$$

where in Formula (5) to Formula (7), θ represents the angle of inclination, $R_i$ represents the distance from the windshield to the light source of the HUD, $\theta_i$ represents the incident angle of the second beam, and $\theta_r$ represents the angle of the second beam going out of the inner surface of the glass. Also, $\eta_1$ represents the angle between a perpendicular that passes the reflection point of the first beam, and a perpendicular that passes a point through which the second beam penetrates the glass plate, and $\eta_2$ represents the angle between a perpendicular at the reflection point of the first beam, and a perpendicular at the reflection point of the second beam on the outer surface of the glass. Also $\eta_3$ represents the angle between a perpendicular at the reflection point of the first beam, and a perpendicular at a point through which the second beam goes out of the inner surface of the glass, $\varphi_i$ represents the angle between the horizontal line and the second beam in the glass plate, and $\varphi_r$ represents the angle between the horizontal line and the second beam in the glass plate having been reflected on the outer surface of the glass.

On the other hand, in the application example 1, the wedge angle δ in the HUD-display area A was determined based on Formula (5) to Formula (7) and the like as in the case described in Patent Document 1. Also, the wedge angle δ in the non-HUD-display area B was determined based on Formula (1). In this case, example settings were η=−3 min in Formula (1), and $\eta_h$=−9.6 min in Formula (2).

[Changes of Wedge Angle at Boundary C]

Here, changes of the wedge angles in the X-direction are illustrated in FIG. 4 and FIG. 5 for the comparative examples 1 to 4 and the application example 1, where the HUD-display area A is set in a range of 400 mm≤X≤490 mm, the non-HUD-display area B is set in a range of 490 mm<X≤1000 mm, and the boundary C is set at X=490 mm. Note that the origin (X=0) is set to a position of the windshield 20 closest to the front end of the vehicle.

Figure 4A:
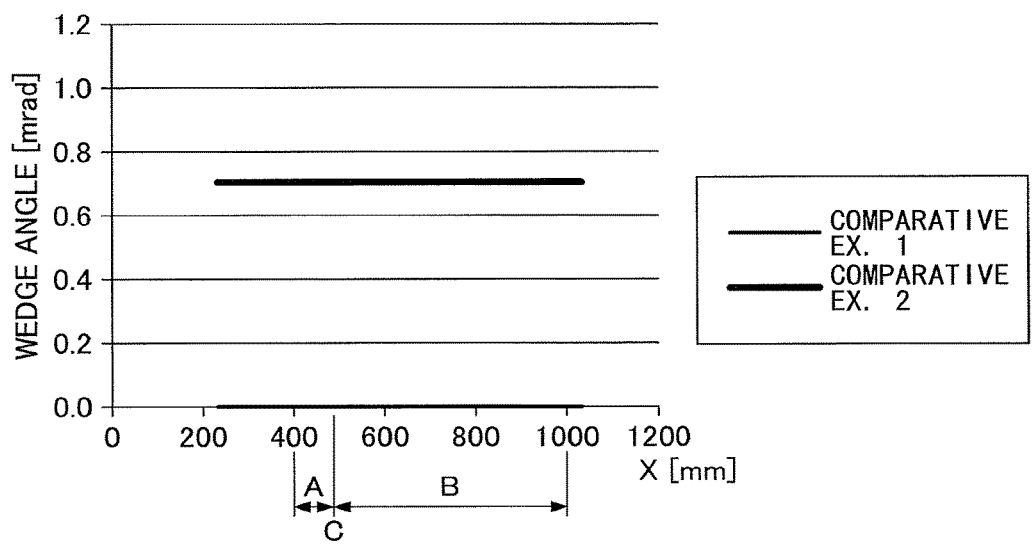
FIG. 4A-4B are first diagrams illustrating change of a wedge angle at the boundary.

As illustrated in FIG. 4A, in the comparative examples 1 and 2, the change of the wedge angle at the boundary C is zero mrad. Consequently, there is no risk of generation of perspective distortion and bubbling at the boundary C in the comparative examples 1 and 2.

Figure 4B:
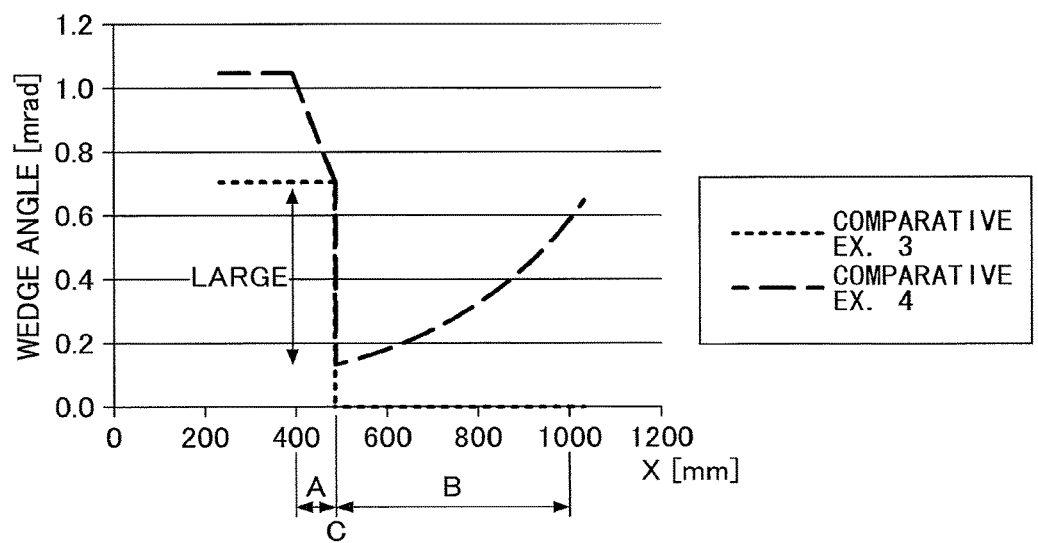

Also, as illustrated in FIG. 4B, the change of the wedge angle at the boundary C is 0.7 mrad in the comparative example 3, and about 0.55 mrad in the comparative example 4. When change of the wedge angle at the boundary C becomes great as much as in the comparative examples 3 and 4, it can be considered that the risk of generation of perspective distortion and bubbling at the boundary C is high.

Figure 5A:
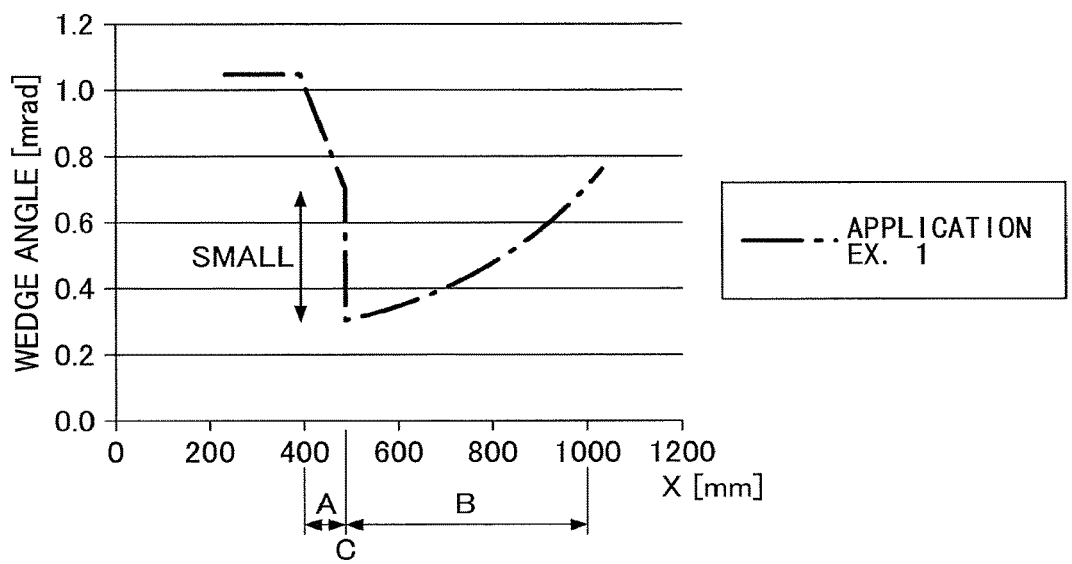
FIG. 5A-5B are second diagrams illustrating change of a wedge angle at the boundary.
Figure 5B:
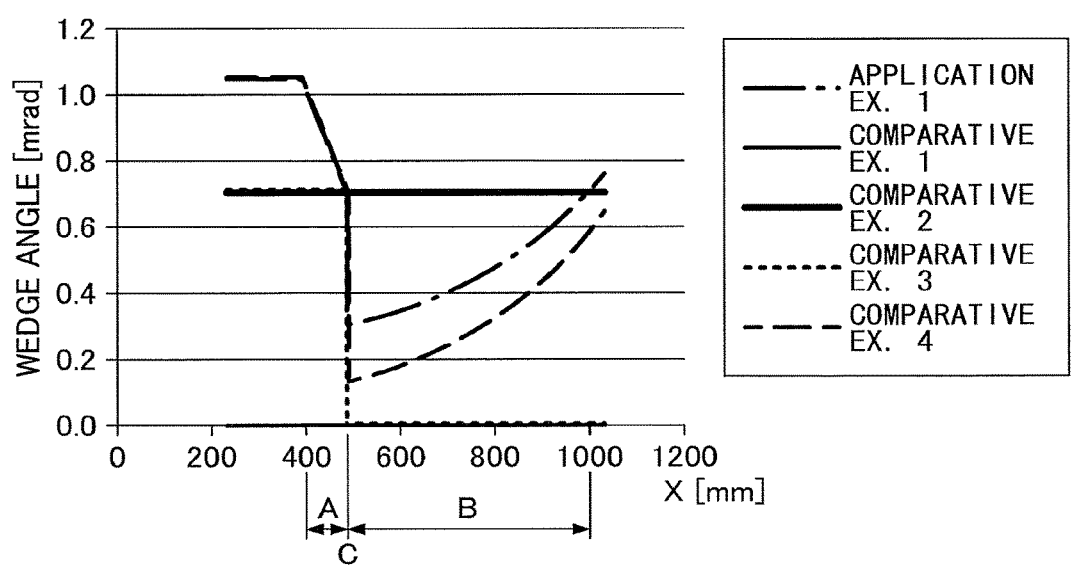

On the other hand, as illustrated in FIG. 5A, the change of the wedge angle at the boundary C in the application example 1 is about 0.38 mrad, which is greater than in the comparative examples 1 and 2, but can be considered improved with respect to the comparative examples 3 and 4. It can be considered that the risk of generation of perspective distortion and bubbling at the boundary C is low for change of the wedge angle as in the application example 1. Note that FIG. 5B is a summarized illustration of FIG. 4A, FIG. 4B, and FIG. 5A.

[Angle of Reflective Double Images, and Angle of Perspective Double Images]

Figure 6A:
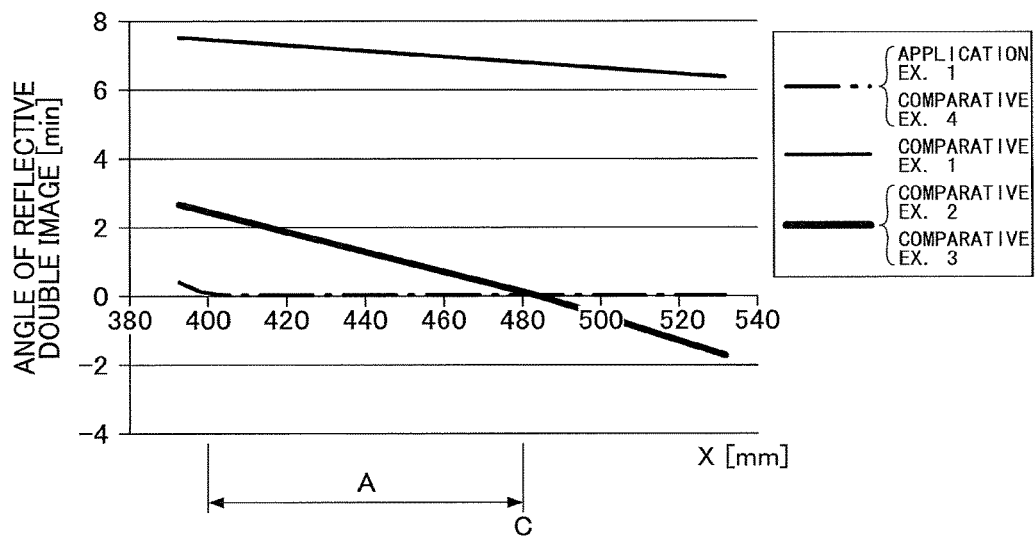
FIG. 6A-6B are diagrams illustrating angles of double images.

Next, for the comparative examples 1 to 4 and the application example 1, the angle of perspective double images in the non-HUD-display area B, and the angle of reflective double images in the HUD-display area A are illustrated in FIG. 6. As illustrated in FIG. 6A, the angles of reflective double images in the HUD-display area A are minimal in the application example 1, large in the comparative example 1, small in the comparative example 2, small in the comparative example 3, and minimal in the comparative example 4, respectively.

Figure 6B:
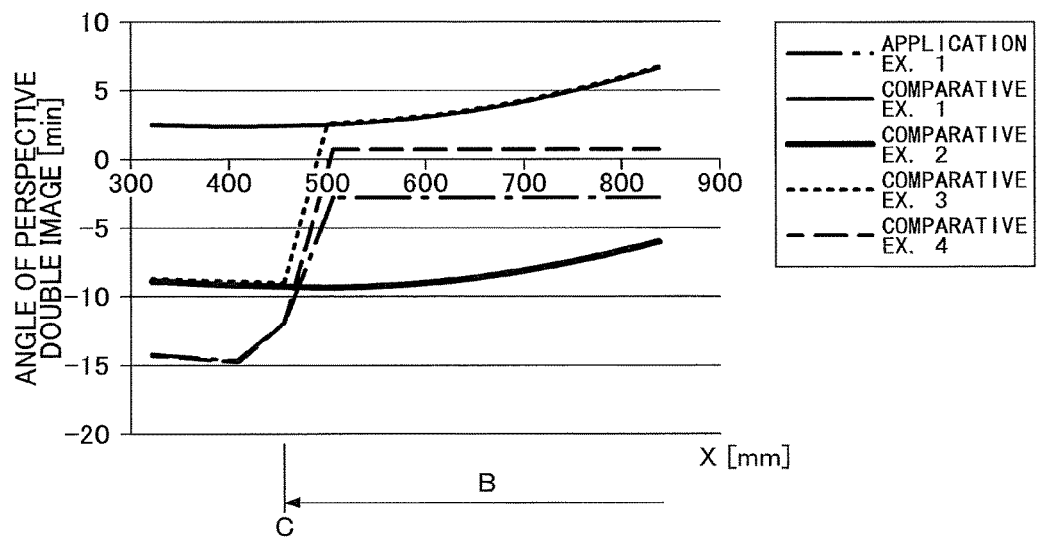

Also, as illustrated in FIG. 6B, the angles of perspective double images in the non-HUD-display area B are small in the application example 1, small in the comparative example 1, large in the comparative example 2, small in the comparative example 3, and minimal in the comparative example 4, respectively. Here, "minimal" means an ideal value, "small" means a sufficiently practical value, and "large" means that the risk is high for generation of the problems.

Note that in the application example 1, the angle of perspective double images in the non-HUD-display area B is about −3 min. This is because η=−3 min was set in Formula (1). In other words, in the application example 1, the value of η in Formula (1) becomes the angle of perspective double images in the non-HUD-display area B as it is. This means that by adjusting the value of η in Formula (1), the angle of perspective double images in the non-HUD-display area B can be set to an arbitrary value.

Table 1 summarizes the results in FIG. 4 to FIG. 6. As illustrated in Table 1, in the comparative example 1, reflective double images pose a problem in the HUD-display area A, and in the comparative example 2, perspective double images pose a problem in the non-HUD-display area B. Also, in the comparative examples 3 and 4, the risk of perspective distortion and bubbling around the boundary C arises as a problem.

In contrast to this, in the application example 1, a value within the range of sufficiently practical values is obtained in terms of reflective double images in the HUD-display area A, perspective double images in the non-HUD-display area B, and the risk of perspective distortion and bubbling around the boundary C.

TABLE 1

|  | SIZE OF REFLECTIVE DOUBLE IMAGE IN HUD DISPLAY AREA A | SIZE OF PERSPECTIVE DOUBLE IMAGE IN NON-HUD DISPLAY AREA B | RISK OF PERSPECTIVE DISTORTION OR BUBBLING IN BOUNDARY C |
|---|---|---|---|
| APPLICATION EX. 1 | MINIMAL | SMALL | LOW |
| COMPARATIVE EX. 1 | LARGE | SMALL | NO |
| COMPARATIVE EX. 2 | SMALL | LARGE | NO |
| COMPARATIVE EX. 3 | SMALL | SMALL | HIGH |
| COMPARATIVE EX. 4 | MINIMAL | MINIMAL | HIGH |

Figure 7:
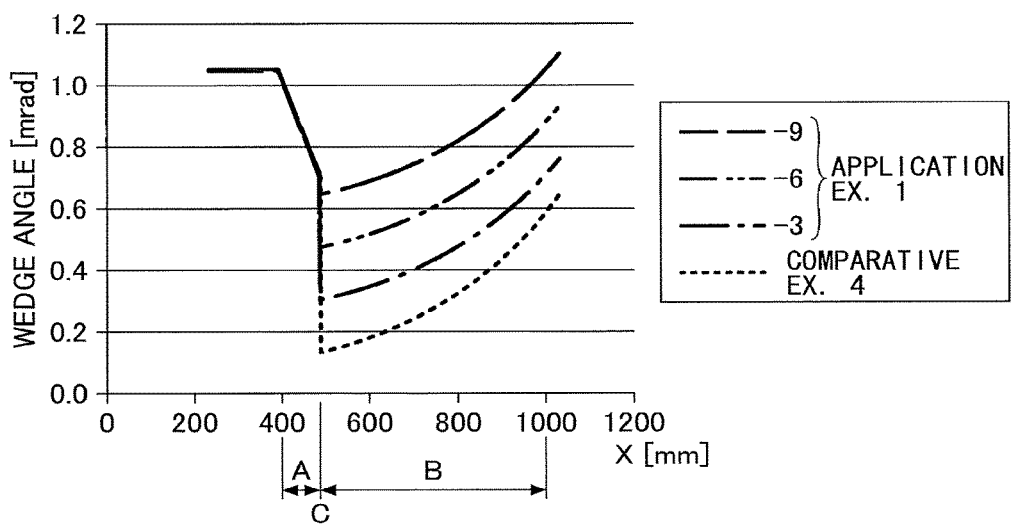
FIG. 7 is a third diagram illustrating change of a wedge angle at the boundary.

Note that in the examples described above, although $\eta = -3$ min was set in Formula (1), $\eta$ may be set to an arbitrary value having the same sign as $\eta_h$, and satisfying conditions of being less than or equal to the smaller one of $2|\eta_h|$ and 9 if $|\eta_h| \leq 9$, being less than or equal to $|\eta_h|$ if $|\eta_h| > 9$ (further, $\eta$ is not equal to 0 at all points in the entire area of the non-HUD-display area B including the edge on the boundary C side in the non-HUD-display area B, and $0 < |\eta|$ at the edge on the boundary C side in the non-HUD-display area B). Here, with the setting of $\eta_h = -9.6$ min, by setting $\eta$ to an arbitrary value that satisfies $-9.6 \leq \eta \leq 0$ is not 0 however, at all points in a partial area of the non-HUD-display area B including the edge on the boundary C side in the non-HUD-display area B, and $0 < |\eta|$ at the edge on the boundary C side in the non-HUD-display area B), substantially the same results can be obtained as in Table 1. Examples illustrated in FIG. 7 include cases of $\eta = -6$ min and $\eta = -9$ min. In FIG. 7, it can be confirmed that the changes of the wedge angle at the boundary C are reduced compared to the comparative example 4.

In this way, in the application example 1, the wedge angle is determined based on Formula (1) in the entire area of the non-HUD-display area B. Thus, the wedge angle can be contained within the range of sufficiently practical values (minimal or small) in terms of perspective double images in the entire area of the non-HUD-display area B, and the risk of perspective distortion and bubbling around the boundary C. Especially, as can be seen by contrasting with the comparative example 4, in the application example 1, perspective double images are intentionally enlarged within the range of sufficiently practical values in the non-HUD-display area B, and instead, change of the wedge angle at the boundary C is avoided to reduce the risk of perspective distortion and bubbling around the boundary C.

Note that in the application example 1, the wedge angle $\delta$ in the HUD-display area A was determined based on Formula (5) to Formula (7) and the like as in the case described in Patent Document 1. However, if reflective double images in the HUD-display area A are within the range of sufficiently practical values (minimal or small), the wedge angle $\delta$ may be determined by another method. For example, the wedge angle $\delta$ in the HUD-display area A may be determined by substantially the same method as in the comparative example 2 or 3.

Application Example 2

In the application example 1, the example has been described in which Formula (1) is applied to the entire area of the non-HUD-display area B that includes the edge on the boundary C side in the non-HUD-display area B. However, Formula (1) has an object to prevent change of the wedge angle at the boundary C, and hence, may not be necessarily applied to the entire area of the non-HUD-display area B. Thereupon, in the application example 2, an example will be described in which Formula (1) is applied only to a partial area of the non-HUD-display area B that includes the edge on the boundary C side in the non-HUD-display area B. Other matters are the same as in the application example 1 unless specifically described.

Figure 8:
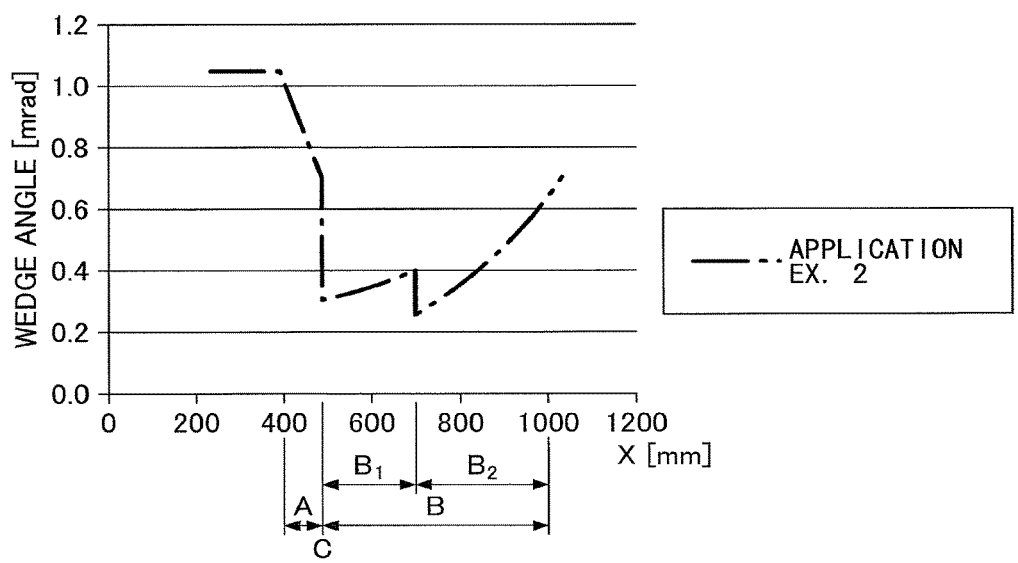
FIG. 8 is a fourth diagram illustrating change of a wedge angle at the boundary.

FIG. 8 illustrates change of the wedge angle in the X-direction where the HUD-display area A is set in the range of 400 mm $\leq$ X < 490 mm, the non-HUD-display area B is set in the range of 490 mm < X $\leq$ 1000 mm, and the boundary C is set at X = 490 mm, as in the application example 1. However, in FIG. 8, the non-HUD-display area B is further divided into areas $B_1$ and $B_2$. Further, Formula (1) is applied to the area $B_1$ of the non-HUD-display area B that is adjacent to the boundary C. Note that the setting of $\eta = -3$ min in Formula (1), and the setting of $\eta_h = -9.6$ min in Formula (2) are the same as in the application example 1.

In this way, by applying Formula (1) to the area $B_1$ of the non-HUD-display area B that is adjacent to the boundary C, it is possible to prevent change of the wedge angle at the boundary C, and to have the size of perspective double images in the area $B_1$ contained within the range of sufficiently practical values. Also, the wedge angle in the area $B_2$ may be set to an arbitrary value that makes the size of perspective double images in the area $B_2$ contained within the range of sufficiently practical values, and does not necessarily need to have Formula (1) applied to, as in the area $B_1$.

In the example in FIG. 8, the wedge angle in the area $B_2$ is set to be substantially the same as in the comparative example 4. Note that the wedge angle in the comparative example 4 corresponds to a case of $\eta = 0$, and the conditions are eliminated, which are "$\eta$ is an arbitrary value having the same sign as $\eta_h$, and satisfying conditions of being less than or equal to the smaller one of $2|\eta_h|$ and 9 if $|\eta_h| \leq 9$, being less than or equal to $|\eta_h|$ if $|\eta_h| > 9$ (further, $\eta$ is not equal to 0 at all points in a partial area of the non-HUD-display area B including the edge on the boundary C side in the non-HUD-display area B, and $0 < |\eta|$ at the edge on the boundary C side in the non-HUD-display area B)".

Alternatively, the conditions in Formula (1) may be changed from "$\eta$ is an arbitrary value having the same sign as $\eta_h$, and satisfying conditions of being less than or equal to the smaller one of $2|\eta_h|$ and 9 if $|\eta_h| \leq 9$, being less than or equal to $|\eta_h|$ if $|\eta_h| > 9$ (further, $\eta$ is not equal to 0 at all points in a partial area of the non-HUD-display area B including the edge on the boundary C side in the non-HUDdisplay area B, and 0<|η| at the edge on the boundary C side in the non-HUD-display area B)", to "η is an arbitrary value satisfying 0≤|η_h|≤9 (further, η is not equal to 0 at all points in a partial area of the non-HUD-display area B including the edge on the boundary C side in the non-HUD-display area B, and 0<|η| at the edge on the boundary C side in the non-HUD-display area B)", to apply Formula (1) to the area B_2 of the non-HUD-display area B. For example, η may be set to an arbitrary value that satisfies −9.0≤η≤9.0. It is preferable to satisfy 0≤|η|≤|6|, and further preferable to satisfy 0≤|η|≤|3|.

Moreover, the area B_2 may be further divided into two or more areas. In this case, although it is necessary to apply Formula (1) to the area B_1, the wedge angles in the divided areas in the area B_2 may be set to arbitrary values as long as the respective sizes of perspective double images are contained within the range of sufficiently practical values.

In FIG. 8, the width of the area B_1 (in the X-direction) can be determined appropriately depending on a required specification. Note that the application example 1 corresponds to a case in which the width of the area B_1 (in the X-direction) equals to the width of the non-HUD-display area B (in the X-direction).

Note that in terms of avoidance of defect such as double images and perspective distortion, the periphery of the windshield 20 is less important than the center part (an area excluding the periphery of the windshield 20). Thereupon, the wedge angle δ may satisfy Formula (1) at each point in an area excluding the periphery of the windshield 20 in the non-HUD-display area B including the edge on the boundary C side in the non-HUD-display area B. In this case, the wedge angle δ may be set to an arbitrary value in the periphery of the windshield 20 that is less important than the center part. The "area excluding the periphery of the windshield 20" here is, for example, an area that corresponds to a test area A specified in JIS (Japanese Industrial Standard) R3212.

So far, the preferable embodiments and the application examples have been described in detail. Note that the present invention is not limited to the above embodiments and application examples, which may be changed and replaced in various ways without departing from the scope of the invention described in the claims.

The invention claimed is:

1. A windshield glass, comprising:
a glass having an inner surface, an outer surface, a first area used by a head-up display installed inside a vehicle, a second area adjacent to the first area, and a wedge angle δ at each point in a partial area of the second area including the edge on the boundary side in the second area such that the second area is not used by the head-up display, an edge on the boundary side in the first area represents an area closest to a boundary between the first area and the second area in the first area, and an edge on the boundary side in the second area represents an area, closest to the boundary in the second area,
wherein the glass is configured to be installed on the vehicle in a position with respect to the head-up display such that the glass has a local incident angle φ of a ray of light emitted in an X-direction designating a front- and rear direction of the vehicle from a light source outside the vehicle to the eyes of a driver in the vehicle and incident on the outer surface of the glass, and that the glass has the wedge angle δ determined by Formula (1), $$\delta = \frac{t}{R} \frac{\sin\varphi\cos\varphi}{n^2 - \sin^2\varphi} - \eta \frac{\cos\varphi}{2\sqrt{n^2 - \sin^2\varphi}} \qquad (1)$$

where the wedge angle δ is formed by the inner surface and the outer surface and excludes a case of a uniform wedge angle δ, t represents a thickness of the glass, R represents a local curvature radius of the glass, n represents a refractive index of the glass, and when $\eta_h$ is determined by Formula (2), $$\eta_h = \frac{2t}{R} \frac{\sin\varphi}{\sqrt{n^2 - \sin^2\varphi}} - \frac{2\delta_h \sqrt{n^2 - \sin^2\varphi}}{\cos\varphi} \qquad (2)$$

where $\eta_h$ is an angle of perspective double images generated by the light from the light source and observed by the driver inside the vehicle at the edge on the boundary side in the first area, $\delta_h$ represents a wedge δ angle at the edge on the boundary side in the first area, η is an arbitrary value having a same sign as a sign of $\eta_h$ and satisfies conditions of being less than or equal to a smaller one of $2|\eta_h|$ and 9 if $|\eta_h|≤9$ and being less than or equal to $|\eta_h|$ if $|\eta_h|>9$, η is not 0 at all points in the part of the area, and 0<|η| is satisfied at the edge on the boundary side in the second area.

2. The windshield glass as claimed in claim 1, wherein in the second area that includes the edge on the boundary side in the second area, at each point in an area excluding a periphery of the glass, the wedge angle δ formed by the inner surface and the outer surface satisfies Formula (1).

3. The windshield glass as claimed in claim 1, wherein at each point in an entire area of the second area that includes the edge on the boundary side in the second area, the wedge angle δ formed by the inner surface and the outer surface satisfies Formula (1), where η is an arbitrary value that satisfies 0≤|η|≤9 and η is not 0 at all points in the entire area.

4. The windshield glass as claimed in claim 1, wherein at each point in an entire area of the second area that includes the edge on the boundary side in the second area, the wedge angle δ formed by the inner surface and the outer surface satisfies Formula (1), where η is an arbitrary value that satisfies 0≤|η|≤6, and η is not 0 at all points in the entire area.

5. The windshield glass as claimed in claim 1, wherein at each point in an entire area of the second area that includes the edge on the boundary side in the second area, the wedge angle δ formed by the inner surface and the outer surface satisfies Formula (1), where η is an arbitrary value that satisfies 0≤|η|≤3, and η is not 0 at all points in the entire area.

6. The windshield glass as claimed in claim 1, wherein the glass comprises a first glass plate forming the inner surface, a second glass plate forming the outer surface of the glass, and an intermediate film interposed between the first glass plate and the second glass plate.

7. The windshield glass as claimed in claim 2, wherein the glass comprises a first glass plate forming the inner surface, a second glass plate forming the outer surface of the glass, and an intermediate film interposed between the first glass plate and the second glass plate.

8. The windshield glass as claimed in claim 3, wherein the glass comprises a first glass plate forming the inner surface, a second glass plate forming the outer surface of the glass, and an intermediate film interposed between the first glass plate and the second glass plate.

9. The windshield glass as claimed in claim 4, wherein the glass comprises a first glass plate forming the inner surface, a second glass plate forming the outer surface of the glass, and an intermediate film interposed between the first glass plate and the second glass plate.

10. The windshield glass as claimed in claim 5, wherein the glass comprises a first glass plate forming the inner surface, a second glass plate forming the outer surface of the glass, and an intermediate film interposed between the first glass plate and the second glass plate.

11. The windshield glass as claimed in claim 1, wherein the glass comprises a first glass plate forming the inner surface, a second glass plate forming the outer surface of the glass, and an intermediate film interposed between the first glass plate and the second glass plate, the first glass plate has a uniform thickness, and the second glass plate has a uniform thickness.

12. A vehicle, comprising the windshield glass of claim 1.
13. A vehicle, comprising the windshield glass of claim 2.
14. A vehicle, comprising the windshield glass of claim 3.
15. A vehicle, comprising the windshield glass of claim 4.
16. A vehicle, comprising the windshield glass of claim 5.
17. A vehicle, comprising the windshield glass of claim 6.
18. A vehicle, comprising the windshield glass of claim 11.

19. The windshield glass as claimed in claim 6, wherein at least one of the first glass plate and the second glass plate comprises inorganic glass, and the intermediate film comprises transparent resin.

20. A vehicle, comprising the windshield glass of claim 19.

* * * * *